(12) United States Patent
Yang et al.

(10) Patent No.: US 11,660,787 B2
(45) Date of Patent: May 30, 2023

(54) AUTOMATIC MOLD CLEANING DEVICE

(71) Applicant: CITIC Dicastal CO., LTD., Hebei (CN)

(72) Inventors: Jinling Yang, Qinhuangdao (CN);
Hongshen Zhang, Qinhuangdao (CN);
Yukun Yang, Qinhuangdao (CN)

(73) Assignee: CITIC DICASTAL CO., LTD., Hebei (CN)

(*) Notice: Subject to any disclaimer, the term of this patent is extended or adjusted under 35 U.S.C. 154(b) by 669 days.

(21) Appl. No.: 16/713,458

(22) Filed: Dec. 13, 2019

(65) Prior Publication Data
US 2020/0406510 A1    Dec. 31, 2020

(30) Foreign Application Priority Data

Jun. 27, 2019   (CN) .......................... 201910565533.7

(51) Int. Cl.
  *B29C 33/72*   (2006.01)
  *B08B 9/08*    (2006.01)
  *B08B 9/093*   (2006.01)
  *B25J 11/00*   (2006.01)

(52) U.S. Cl.
  CPC .............. *B29C 33/72* (2013.01); *B08B 9/083* (2013.01); *B08B 9/0821* (2013.01); *B08B 9/093* (2013.01); *B25J 11/0085* (2013.01); *B08B 2203/007* (2013.01); *B08B 2203/0217* (2013.01)

(58) Field of Classification Search
  CPC ...... B08B 2203/007; B08B 2203/0217; B08B 3/024; B08B 9/0821; B08B 9/083; B08B 9/093; B25J 11/0085; B29C 33/72
  See application file for complete search history.

(56) References Cited

U.S. PATENT DOCUMENTS

| | | | | |
|---|---|---|---|---|
| 4,365,383 A * | 12/1982 | Bartlett | ................. | F16K 11/056 |
| | | | | 15/312.1 |
| 4,443,269 A * | 4/1984 | Capella | .................. | B08B 3/006 |
| | | | | 134/25.4 |
| 4,768,533 A * | 9/1988 | Hall | ........................ | B05B 14/40 |
| | | | | 134/183 |
| 5,277,208 A * | 1/1994 | Mansur | ..................... | B08B 3/02 |
| | | | | 134/107 |
| 6,257,254 B1 * | 7/2001 | Rochette | .................. | B08B 3/02 |
| | | | | 239/243 |
| 6,368,417 B1 * | 4/2002 | Weber | ................ | B29D 30/0662 |
| | | | | 451/36 |
| 6,804,579 B1 * | 10/2004 | Laski | ..................... | B25J 9/0018 |
| | | | | 318/587 |

(Continued)

FOREIGN PATENT DOCUMENTS

| | | |
|---|---|---|
| CN | 1730173 A | 2/2006 |
| CN | 200963627 Y | 10/2007 |

(Continued)

OTHER PUBLICATIONS

Gao et al., CN-202779019-U, Machine Translation, Abstract. (Year: 2022).*

(Continued)

*Primary Examiner* — Christopher Remavege
(74) *Attorney, Agent, or Firm* — Cooper Legal Group, LLC

(57) ABSTRACT

An automatic mold cleaning device includes an automatic cleaning system, a mold clamping system and a waste recovery system.

7 Claims, 2 Drawing Sheets

(56) References Cited

U.S. PATENT DOCUMENTS

| | | | | |
|---|---|---|---|---|
| 2008/0135065 A1* | 6/2008 | Yao | ............................ | B08B 3/02 |
| | | | | 134/32 |
| 2009/0283119 A1* | 11/2009 | Moussa | ................... | B29C 64/35 |
| | | | | 134/147 |
| 2012/0006363 A1* | 1/2012 | Milojevic | ................ | B08B 3/024 |
| | | | | 134/144 |
| 2012/0080060 A1* | 4/2012 | Haremaki | ................. | B08B 3/02 |
| | | | | 134/99.1 |
| 2018/0043403 A1* | 2/2018 | Zippel | ........................ | B08B 3/10 |

FOREIGN PATENT DOCUMENTS

| | | | | | |
|---|---|---|---|---|---|
| CN | 202779019 U | * | 3/2013 | | |
| CN | 103240242 A | | 8/2013 | | |
| CN | 203726687 U | | 7/2014 | | |
| CN | 204724496 U | | 10/2015 | | |
| CN | 105428280 A | | 3/2016 | | |
| CN | 106111616 A | | 11/2016 | | |
| CN | 107053552 A | | 8/2017 | | |
| CN | 107413732 A | | 12/2017 | | |
| CN | 107530992 A | | 1/2018 | | |
| CN | 108188078 A | | 6/2018 | | |
| CN | 208098691 U | | 11/2018 | | |
| CN | 109663778 A | | 4/2019 | | |
| CN | 110000141 A | | 7/2019 | | |
| DE | 3515255 A | * | 10/1986 | ............. | B29C 33/72 |
| JP | 2010274354 A | | 12/2010 | | |

OTHER PUBLICATIONS

Weichand et al., DE-3515255-A, Machine Translation, Abstract. (Year: 2022).*

\* cited by examiner

AUTOMATIC MOLD CLEANING DEVICE

CROSS-REFERENCE TO RELATED APPLICATION

The present application claims benefit of Chinese Patent Application No. 201910565533.7, filed on Jun. 27, 2019, the contents of which are hereby incorporated by reference in their entirety.

BACKGROUND

Cleaning of a hub mold is high in worker labor intensity, time-consuming, labor-intensive and low in efficiency, which becomes a bottleneck for improving efficiency in production, and also becomes a factor affecting the production efficiency. To solve the problems, meet the requirements of high-efficiency production and improve the labor productivity, an automatic cleaning device is needed to improve the production efficiency of a product.

SUMMARY

The present disclosure relates to the technical field of mold, and specifically to an automatic mold cleaning device.

In view of this, the present disclosure is directed to provide an automatic mold cleaning device, which solves the problems of low efficiency and high labor intensity during manual mold cleaning, and improves the production efficiency.

In order to achieve the above objective, the present disclosure provides the following technical solution.

An automatic mold cleaning device, including: an automatic cleaning system including a robot and a high pressure cleaning component, the robot being capable of driving the high pressure cleaning component to clean a surface of a mold;

a mold clamping system being capable of clamping the mold and driving the mold to tilt and turn; and a waste recovery system including a separator, a hoist and a collector, the separator being capable of separating a detergent and waste, and the waste being transported to the collector through the hoist.

In an embodiment, the mold clamping system includes a main frame, a guide rail is disposed on the main frame, a right movable frame is disposed on the guide rail, the mold clamping system further includes a servo electric cylinder, the servo electric cylinder and a piston rod thereof are respectively fixed to the main frame and the right movable frame, a reduction motor is also fixed to the main frame, an output end of the reduction motor is fixedly connected to a left rotating shaft, a right rotating shaft is disposed on the right movable frame corresponding to the left rotating shaft, and the left rotating shaft and the right rotating shaft are fixedly connected to two sides of the mold.

In an embodiment, the output end of the reduction motor is connected to a reducer, and the reducer is fixedly connected to the left rotating shaft.

In an embodiment, the automatic cleaning system further includes a detergent heating member, a high pressure water pump and a nozzle connected in order as well as a high pressure detergent pipe, the nozzle being fixedly mounted to a head clamping jaw of the robot.

In an embodiment, the nozzle is a V-shaped nozzle.

In an embodiment, the separator is located at the lower part of the main frame, the lower part of the separator is connected to a separation reduction motor, the lower part of the separation reduction motor corresponds to the bottom of the hoist, and the upper part of the collector corresponds to the top of the hoist.

In an embodiment, the robot is configured to drive the nozzle to reciprocate between a center and an edge of the mold in such a manner that the nozzle moves from the center to the edge of the mold, turns at the edge by a certain angle and then moves back to the center.

In an embodiment, the robot is configured to drive the nozzle to move along multiple circles from the center to the edge of the mold.

Compared with the prior art, the automatic mold cleaning device of the present disclosure has the following advantages:

1) The problems of low efficiency and high labor intensity during manual mold cleaning are solved, and the production efficiency is improved.

2) Using the programmable characteristics of traveling trajectories of the arms and head of the robot, the detergent can be sprayed to clean any position of the surface of the mold, so the design is more flexible.

3) The separator separates the detergent and the dirt cleaned from the mold.

4) The present disclosure has the characteristics of ideal effect, high efficiency, high operating safety and reliability, and the like.

The present disclosure is simple in structure and reliable in performance, and can correct the roundness of a radial positioning surface of a blank before machining and correct the end face of an axial positioning surface, thereby improving the roundness of a blank rim, and improving the yield and machining quality of a wheel.

BRIEF DESCRIPTION OF DRAWINGS

The accompanying drawings constituting a part of the present disclosure are used for providing a further understanding of the present disclosure, and the schematic embodiments of the present disclosure and the descriptions thereof are used for interpreting the present disclosure, rather than constituting improper limitations to the present disclosure. In the drawings.

List of reference symbols 1—reducer, 2—coupling, 3—left rotating shaft, 4—mold, 5—bearing, 6—right rotating shaft, 7—right movable frame, 8—servo electric cylinder, 9—main frame, 10—guide rail, 11—motor fixing bracket, 12—reduction motor, 13—robot, 14—detergent heating member, 15—high pressure water pump, 16—high pressure detergent pipe, 17—pipe holder, 18—nozzle.

DETAILED DESCRIPTION

It should be noted that the embodiments in the present disclosure and the features in the embodiments can be combined with each other without conflicts.

The following clearly and completely describes the technical solutions of the present disclosure with reference to the accompanying drawings and in combination with the embodiments. Apparently, the described embodiments are part of, not all of, the embodiments of the present disclosure. All other embodiments obtained by those of ordinary skill in the art based on the embodiments of the present disclosure without creative efforts shall fall within the protection scope of the present disclosure.

An automatic mold cleaning device according to an embodiment of the present disclosure will be described below with reference to FIG. 1 and FIG. 2 and in combination with embodiments.

Figure 1:
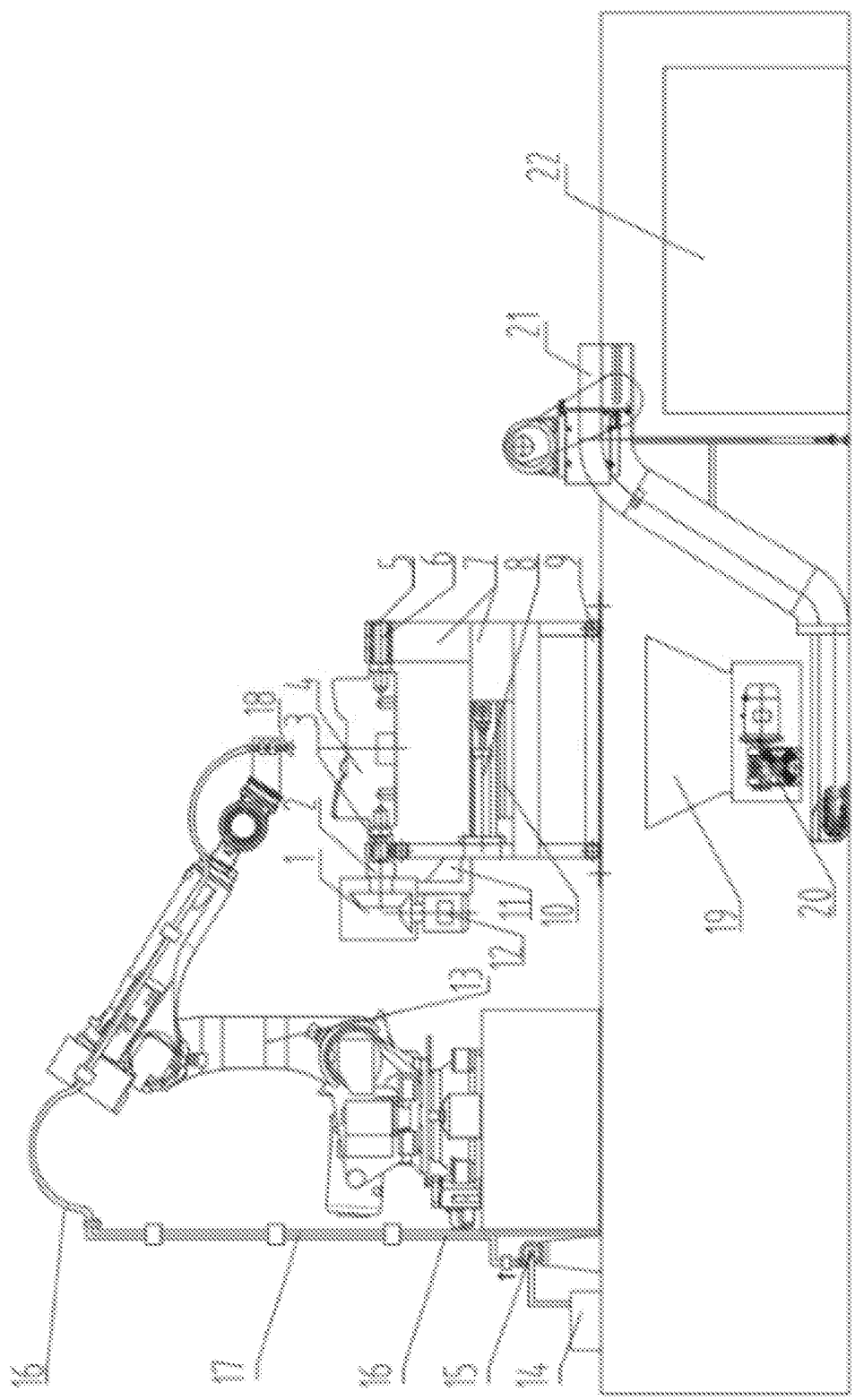
FIG. 1 is a schematic diagram of an automatic mold cleaning device according to the present disclosure.
Figure 2:
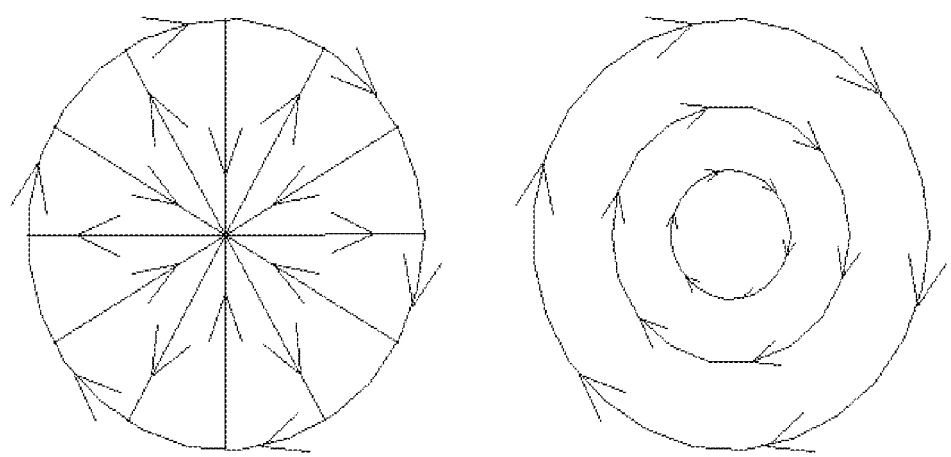
FIG. 2 is a route diagram of a nozzle of the automatic mold cleaning device according to the present disclosure on the surface of a mold.

The automatic mold cleaning device shown in FIG. 1 and FIG. 2 includes: an automatic cleaning system including a robot 13 and a high pressure cleaning component, the robot 13 being capable of driving the high pressure cleaning component to clean a surface of a mold;

a mold clamping system being capable of clamping the mold 4 and driving the mold to tilt and turn to completely clean the mold 4; and a waste recovery system including a separator 19, a hoist 21 and a collector 22, the separator 19 being capable of separating a detergent and waste, the waste being transported to the collector 22 through the hoist 21, and the detergent being reused.

In an embodiment, the mold clamping system includes a main frame 9, a guide rail 10 is disposed on the main frame 9, and a right movable frame 7 is disposed on the guide rail 10. The mold clamping system further includes a servo electric cylinder 8, the servo electric cylinder 8 and a piston rod thereof are respectively fixed to the main frame and the right movable frame 7, the piston rod of the servo electric cylinder 8 may be connected to the main frame 9, and the servo electric cylinder 8 is mounted to the right movable frame 7, or the piston rod of the servo electric cylinder 8 is connected to the right movable frame 7, and the servo electric cylinder 8 is mounted to the main frame 9. The piston rod of the electric cylinder 8 pushes or pulls the right movable frame 7 to move left and right on the guide rail 10 to implement disassembly and assembly of the mold 4. A reduction motor 12 is also fixed to the main frame 9, the reduction motor 12 is mounted to the main frame 9 through a motor fixing bracket 11 mounted to the main frame 9, an output end of the reduction motor 12 is fixedly connected to a left rotating shaft 3, a right rotating shaft 6 is disposed on the right movable frame 7 corresponding to the left rotating shaft 3, and the left rotating shaft 3 and the right rotating shaft 6 are fixedly connected to two sides of the mold 4.

Both the left rotating shaft 3 and the right rotating shaft 6 are rotated in bearings 5, and the bearings 5 are respectively mounted into the main frame and the right movable frame 7.

In an embodiment, the output end of the reduction motor 12 is connected to a reducer 1, and the reducer 1 is fixedly connected to the left rotating shaft 3. The reducer 1 is fixedly connected to the left rotating shaft 3 mounted in the bearing 5, so that the transmission is smooth and the structure is stable.

In an embodiment, the automatic cleaning system further includes a detergent heating member 14, a high pressure water pump 15 and a nozzle 18 connected in order as well as a high pressure detergent pipe 16, the nozzle is a V-shaped nozzle, and the nozzle 18 is fixedly mounted to a head clamping jaw of the robot 13. The surface of the mold is cleaned with a hot high pressure detergent sprayed from the nozzle 18 to achieve the purpose of cleaning the surface of the mold.

The robot 13 is placed on a base on the ground, the detergent heating member 14 is placed on the ground, the high pressure water pump 15 is placed on the base on the ground, the high pressure detergent pipe 16 is placed on a pipe holder 17 to transport the hot high pressure detergent, the high pressure detergent V-shaped nozzle 18 is placed on the arm or head clamping jaw of the robot 13, the detergent heating member 14 is connected to the high pressure water pump 15 through the high pressure detergent pipe 16, and the high pressure detergent pipe 16 is connected to the high pressure detergent V-shape nozzle 18 on the head of the robot 13 to achieve the purpose of spraying the detergent.

In an embodiment, the separator 19 is located at the lower part of the main frame 9, the lower part of the separator 19 is connected to a separation reduction motor 20, the separation reduction motor 20 is connected to a main shaft of the separator 19, the lower part of the separation reduction motor 20 corresponds to the bottom of the hoist 21, the upper part of the collector 22 corresponds to the top of the hoist 21, the separator 19 is disposed on the left side of the hoist 21, and the lower part of the main frame 9 is used for separating the detergent and the dirt cleaned from the mold. The separated detergent is filtered and returned to the detergent heating member 14 for reuse, the collector 22 is placed under the right side of the hoist 21 to collect the waste, and the separator 19, the hoist 21, and the collector 22 are placed in a trench.

In an embodiment, the robot 13 is configured to drive the nozzle 18 to reciprocate between a center and an edge of the mold in such a manner that the nozzle moves from the center to the edge of the mold 4, turns at the edge by a certain angle and then moves back to the center.

In an embodiment, the robot 13 is configured to drive the nozzle 18 to move along multiple circles from the center to the edge of the mold 4.

Using the programmable characteristics of traveling trajectories of the arms and head of the robot, routes of the V-shaped nozzle 18 at the arm or head of the robot on the surface of the mold are programmed as shown in FIG. 2, where a trajectory of traveling from the center to the edge is as shown by the arrows, and the surface of the mold is cleaned using the hot high pressure detergent sprayed from the nozzle; and the other trajectory of traveling several circles around the center is as shown by the arrows, the surface of the mold is cleaned with the hot high pressure detergent sprayed from the nozzle to achieve the purpose of cleaning the surface of the mold.

In an embodiment, the left rotating shaft 3 is inserted into a left hole of the mold 4, and a right hole of the mold 4 is aligned with the right rotating shaft 6. The right end of the servo electric cylinder 8 drives the right movable frame 7 to slide to the left on the guide rail 10, the right rotating shaft 6 is inserted into the right hole of the mold 4, the left rotating shaft 3 and the right rotating shaft 6 axially clamp the mold 4 under the clamping force of the right end of the servo electric cylinder 8, the main shaft of the reduction motor 12 rotates through the reducer 1, and the left rotating shaft 3 can rotate and drive the clamped mold 4 to rotate. Through rotation or 360-degree rotation of the front and back of the mold 4, the front and back or other positions of the mold 4 are sprayed with the high pressure detergent to clean the sundries on the surface. Using the programmable characteristics of traveling trajectories of the arms and head of the robot, routes of the V-shaped nozzle 18 clamped by the arm or head clamping jaw of the robot on the surface of the mold are programmed as shown in FIG. 2, where a trajectory of traveling from the center to the edge is as shown by the arrows, and the surface of the mold is cleaned using the high pressure detergent sprayed from the nozzle; and the other trajectory of traveling several circles around the center is as shown by the arrows, the surface of the mold is cleaned with the hot high pressure detergent sprayed from the nozzle to achieve the purpose of cleaning the surface of the mold. The separation reduction motor 20 is connected to the main shaft of the separator 19, the separator 19 is disposed on the left side of the hoist 21, and the lower part of the main frame 9 is used for separating the detergent and the dirt cleaned from the mold. The separated detergent is filtered and returned to the detergent heating member 14 for reuse. The collector 22 is placed under the right side of the hoist 21 to collect the waste.

Compared with the prior art, the automatic mold cleaning device of the present disclosure has the following advantages:

1) The problems of low efficiency and high labor intensity during manual mold cleaning are solved, and the production efficiency is improved.

2) Using the programmable characteristics of traveling trajectories of the arms and head of the robot, the detergent can be sprayed to clean any position of the surface of the mold, so the design is more flexible.

3) The separator separates the detergent and the dirt cleaned from the mold.

4) The present disclosure has the characteristics of ideal effect, high efficiency, high operating safety and reliability, and the like.

The present disclosure is simple in structure and reliable in performance, and can correct the roundness of a radial positioning surface of a blank before machining and correct the end face of an axial positioning surface, thereby improving the roundness of a blank rim, and improving the yield and machining quality of a wheel.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. Automatic mold cleaning device, comprising:
   an automatic cleaning system comprising a robot and a high pressure cleaning component, the robot configured to drive the high pressure cleaning component to clean a surface of a mold;
   a mold clamping system comprising a main frame, wherein a horizontal guide rail is disposed on the main frame, a right movable frame is disposed on the horizontal guide rail, the mold clamping system further comprises a servo electric cylinder, the servo electric cylinder and a piston rod thereof are respectively fixed to the main frame and the right movable frame, the piston rod of the servo electric cylinder pushes or pulls the right movable frame to move left and right on the horizontal guide rail,
   a reduction motor is also fixed to the main frame, an output end of the reduction motor is fixedly connected to a left rotating shaft, a right rotating shaft is disposed on the right movable frame corresponding to the left rotating shaft, and the left rotating shaft and the right rotating shaft are fixedly connected to two sides of the mold to clamp the mold and drive the mold to tilt and turn; and
   a waste recovery system comprising a separator, a hoist and a collector, the separator configured to separate a detergent and waste, and the waste being transported to the collector through the hoist.

2. The automatic mold cleaning device according to claim 1, wherein the output end of the reduction motor is connected to a reducer, and the reducer is fixedly connected to the left rotating shaft.

3. The automatic mold cleaning device according to claim 1, wherein the automatic cleaning system further comprises a detergent heating member, a high pressure water pump and a nozzle connected in order as well as a high pressure detergent pipe, the nozzle being fixedly mounted to a head clamping jaw of the robot.

4. The automatic mold cleaning device according to claim 3, wherein the nozzle is a V-shaped nozzle.

5. The automatic mold cleaning device according to claim 1, wherein the separator is located at a lower part of the main frame, a lower part of the separator is connected to a separation reduction motor, a lower part of the separation reduction motor corresponds to a bottom of the hoist, and an upper part of the collector corresponds to a top of the hoist.

6. The automatic mold cleaning device according to claim 3, wherein the robot is configured to drive the nozzle to reciprocate between a center and an edge of the mold in such a manner that the nozzle moves from the center to the edge of the mold, turns at the edge by a certain angle and then moves back to the center.

7. The automatic mold cleaning device according to claim 3, wherein the robot is configured to drive the nozzle to move along multiple circles from a center to an edge of the mold.

* * * * *